United States Patent Office 2,831,435
Patented Apr. 22, 1958

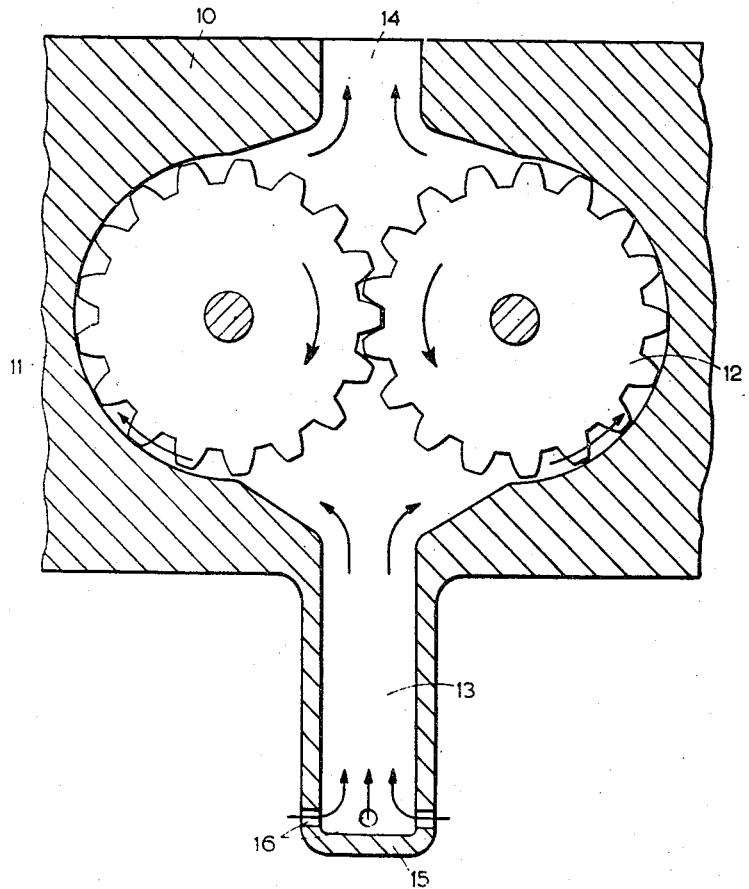

2,831,435

PUMPS

Howard Frederick Hobbs and Anthony Rex Hepburn Allen, Leamington Spa, England, assignors to Hobbs Transmission Limited, Leamington Spa, England Application January 9, 1956, Serial No. 558,095

Claims priority, application Great Britain January 14, 1955

1 Claim. (Cl. 103—126)

This invention relates to pumps and to variable ratio power transmission apparatus utilising pumps for providing liquid pressure for effecting engagement of clutches and/or brakes therein.

Difficulties have been experienced in reducing noise in such apparatus especially at certain moderate and low speeds. At least some of this noise has now been found to emanate from the suction side of the pump, causing noise and vibration in the suction pipe and in the bottom wall of the pump.

According to the present invention the pump suction pipe has its end closed, and openings of limited area are provided in the side of the pipe near its end so that oil or other liquid is drawn into the pipe through these openings instead of through the bottom of the pipe.

The invention will now be described by way of example with reference to the accompanying drawing which is a sectional view of a pump made in accordance with the invention.

The pump comprises a housing 10 containing a pair of toothed rotors 11, 12 in mesh with each other and drawing liquid in through a suction pipe 13 and exhausting it into an outlet duct 14. The end of the pipe 14 is closed by a plug or end wall 15 and this wall is normally close to the base or wall of a sump or other oil container. Four openings 16 are provided in the side of the pipe near the end wall 15. More than four holes may be provided of correspondingly smaller size. The pipe 13 is elongated and extends downwardly from the housing 10 and has its longitudinal axis passing through the zone of the rotor intermesh; said axis being perpendicular to the plane common to the axes of the rotors 11, 12.

The sum of the areas of the openings may be of such size that the velocity of the liquid passing through the openings will always exceed 6 feet per second, so as to maintain a pressure drop of say 1.5 lb./sq. in. (or at least 1 lb./sq. inch) across the openings.

The sum of the cross-sectional areas of the openings may be less than the cross-sectional area of the pipe.

In apparatus as used in accordance with the invention the total cross-sectional area is about .05 sq. in., and the delivery of the pump at 1,000 R. P. M. is about 12 cu. in. This is the sort of restriction required and at 1,000 R. P. M. would usually involve a velocity through the holes of more than 30 ft. per second.

The invention may be used with any type of pump but is particularly intended for use with toothed gear pumps.

The pump may usefully be employed for various purposes and especially in a variable ratio power transmission apparatus for supplying liquid pressure to a control device for varying the ratio, and/or to friction engaging devices, i. e. clutches and/or brakes, of such apparatus.

We claim:

In a motor vehicle provided with a variable ratio power transmission apparatus, a pump having toothed rotors to provide liquid pressure to the apparatus, means for reducing the noise and vibration emanating from the suction side of the pump, said means comprising a downwardly extending elongated suction pipe having its longitudinal axis passing through the zone of rotor intermesh and having said axis perpendicular to the plane common to the axes of the rotors, said pipe having its bottom end closed, a plurality of small inlet openings in the side of said pipe close to the closed bottom end; the size of each opening being such that a minimum pressure drop of at least one pound per square inch exists across the openings and that the sum total of the cross-sectional areas of the inlet openings is less than the cross-sectional area of the pipe.

References Cited in the file of this patent

UNITED STATES PATENTS

| 89,269 | Andrew | Apr. 27, 1869 |
| 159,599 | Meitzler et al. | Feb. 9, 1875 |
| 212,067 | Stoner | Feb. 4, 1879 |
| 1,563,583 | Millspaugh | Dec. 1, 1925 |
| 1,590,964 | Street | June 29, 1926 |
| 1,947,551 | Hobson | Feb. 20, 1934 |
| 2,035,326 | Mahaney | Mar. 24, 1936 |
| 2,272,388 | Williams | Feb. 10, 1942 |
| 2,287,318 | McIntyre | June 23, 1942 |
| 2,464,347 | Roofe | Mar. 15, 1949 |